United States Patent
Mellet et al.

(10) Patent No.: US 8,375,710 B2
(45) Date of Patent: Feb. 19, 2013

(54) TRANSMISSION HYDRAULIC CONTROL SYSTEM HAVING AN ACCUMULATOR FOR PRIMING A PUMP

(75) Inventors: Edward W. Mellet, Rochester Hills, MI (US); Carlos E. Marin, Oxford, MI (US); James B. Borgerson, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 796 days.

(21) Appl. No.: 12/505,993

(22) Filed: Jul. 20, 2009

(65) Prior Publication Data

US 2011/0011074 A1 Jan. 20, 2011

(51) Int. Cl.
*F16D 31/02* (2006.01)
(52) U.S. Cl. ............................................ 60/413; 60/329
(58) Field of Classification Search .................. 60/413, 60/625, 329; 137/593; 138/30; 417/302
See application file for complete search history.

(56) References Cited

U.S. PATENT DOCUMENTS

| 4,373,869 | A | * | 2/1983 | Martin et al. | 417/213 |
| 5,355,676 | A | * | 10/1994 | Inokuchi | 60/413 |
| 2004/0016230 | A1 | * | 1/2004 | Hale | 60/413 |
| 2004/0129475 | A1 | * | 7/2004 | Forsyth et al. | 180/233 |
| 2005/0066655 | A1 | * | 3/2005 | Aarestad et al. | 60/413 |

* cited by examiner

*Primary Examiner* — Thomas E Lazo
*Assistant Examiner* — Logan Kraft

(57) ABSTRACT

A hydraulic control system for a powertrain includes a sump for storing a hydraulic fluid and a pump having an inlet in communication with the sump and an outlet. A valve system is in communication with the outlet of the pump. An accumulator for storing and releasing the hydraulic fluid is in communication with the inlet of the pump and with the valve system. A first control device is disposed between the accumulator and the valve system. A second control device is disposed between the accumulator and the inlet of the pump. The accumulator is charged with the hydraulic fluid when the pump is powered, the accumulator stores the hydraulic fluid when the first control device and the second control device are in the closed condition, and the accumulator releases the hydraulic fluid and primes the pump when the second control device is in the open condition.

13 Claims, 4 Drawing Sheets

TRANSMISSION HYDRAULIC CONTROL SYSTEM HAVING AN ACCUMULATOR FOR PRIMING A PUMP

FIELD

The present disclosure relates to a transmission hydraulic control system having an accumulator, and more particularly to a transmission hydraulic control system having an accumulator for priming a pump.

BACKGROUND

The statements in this section merely provide background information related to the present disclosure and may or may not constitute prior art.

A typical automatic transmission includes a hydraulic control system that, among other functions, is employed to actuate a plurality of torque transmitting devices. These torque transmitting devices may be, for example, friction clutches and brakes. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to the plurality of torque transmitting devices within the transmission. The pressurized hydraulic fluid delivered to the torque transmitting devices is used to engage or disengage the devices in order to obtain different gear ratios.

In energy efficient motor vehicles, the engine may be stopped and started during appropriate conditions in order to improve the fuel economy of the vehicle. During an engine stop, the pump is no longer active and providing pressurized hydraulic fluid to the valve body. During engine restart, the pump may be delayed in providing pressurized hydraulic fluid to the valve body due to the time needed to pull hydraulic fluid from a sump to the pump. This delay may be increased in cold conditions. Accordingly, there is room in the art for improved hydraulic control circuits that reduce the amount of complex components while improving efficiency and controllability of the system during restart of the engine.

SUMMARY

An example of a hydraulic control system in a powertrain according to the principles of the present disclosure is provided. The powertrain includes a transmission and an engine. The hydraulic control system includes a sump for storing a hydraulic fluid and a pump having an inlet in communication with the sump and an outlet. The pump is powered by the engine. A valve system is in communication with the outlet of the pump and is operable to control the transmission. An accumulator for storing and releasing the hydraulic fluid is in communication with the inlet of the pump and with the valve system. A first control device is disposed between the accumulator and the valve system. The first control device includes an open condition for allowing fluid communication between the accumulator and the valve system and a closed condition for preventing fluid communication between the accumulator and the valve system. A second control device is disposed between the accumulator and the inlet of the pump. The second control device includes an open condition for allowing fluid communication between the accumulator and the inlet of the pump and a closed condition for preventing fluid communication between the accumulator and the inlet of the pump. The accumulator is charged with the hydraulic fluid when the engine is on and the pump is powered, the accumulator stores the hydraulic fluid when the first control device and the second control device are in the closed condition, the accumulator releases the hydraulic fluid and charges the valve system when the first control device is in the open condition, and the accumulator releases the hydraulic fluid and charges the pump when the second control device is in the open condition.

In one aspect of the present disclosure, the second control device is an on/off solenoid.

In another aspect of the present disclosure, the second control device is a thermal regulator device operable to sense a temperature, where the thermal regulator device is in the closed condition when the thermal regulator device senses a temperature above a predetermined threshold and is in the open condition when the thermal regulator device senses a temperature below the predetermined threshold.

In yet another aspect of the present disclosure, the first control device is a solenoid.

In yet another aspect of the present disclosure, a first one-way valve is in communication with the sump, the inlet of the pump, and the second control device, and the first one-way valve allows communication of the hydraulic fluid from the sump to the inlet of the pump and prevents communication of the hydraulic fluid from the second control device to the sump.

In yet another aspect of the present disclosure, a second one-way valve is in communication with the outlet of the pump, the valve system, and the accumulator, and the first one-way valve allows communication of the hydraulic fluid from the outlet of the pump to the valve system and prevents communication of the hydraulic fluid from the accumulator to the outlet of the pump.

In yet another aspect of the present disclosure, a third one-way valve is in communication with second one-way valve, the valve system, and the first control device, and the third one-way valve allows communication of the hydraulic fluid from the accumulator and the first control device to the valve system and prevents communication of the hydraulic fluid from the outlet of the pump and the second one-way valve to the first control device.

In yet another aspect of the present disclosure, a fourth one-way valve is in communication with second one-way valve, the third one-way valve, the accumulator, and the valve system, and the fourth one-way valve allows communication of the hydraulic fluid from the second one-way valve and the pump to the accumulator and prevents communication of the hydraulic fluid from the accumulator to the valve system.

In yet another aspect of the present disclosure, the fourth one-way valve is in parallel relationship with the third one-way valve and the first control device.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
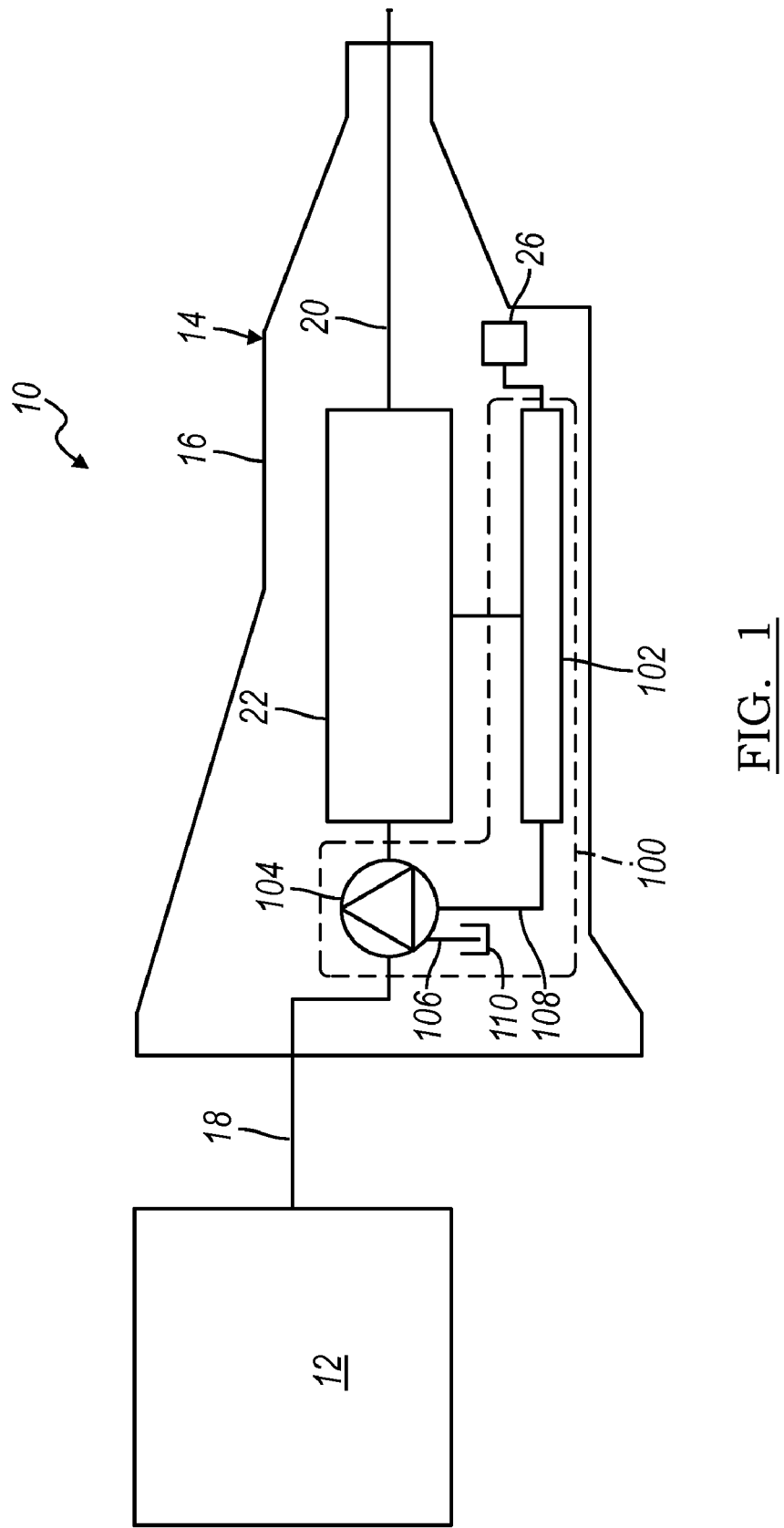
FIG. 1 is a schematic diagram of a powertrain having a hydraulic control system according to the principles of the present disclosure.

With reference to FIG. 1, an exemplary powertrain is generally indicated by reference number 10. The powertrain includes an engine 12 drivingly coupled to a transmission 14. The engine 12 may be a conventional internal combustion engine or an electric engine, or any other type of prime mover, without departing from the scope of the present disclosure. In addition, additional components, such as hydrodynamic fluid driving devices such as torque converters, fluid couplings, or electric motors may be disposed between the engine 12 and the transmission 14 without departing from the scope of the present disclosure. The engine 12 supplies a driving torque to the transmission 14.

The transmission 14 includes a typically cast, metal housing 16 which encloses and protects the various components of the transmission 14. The housing 16 includes a variety of apertures, passageways, shoulders and flanges which position and support these components. The transmission 14 includes a transmission input shaft 18, a transmission output shaft 20, and a gear and clutch arrangement 22. It should be appreciated that while the transmission 14 is illustrated as a rear wheel drive transmission, the transmission 14 may have other configurations without departing from the scope of the present disclosure. The transmission input shaft 18 is connected with the engine 12 and receives input torque or power from the engine 12. The transmission output shaft 20 is preferably connected with a final drive unit (not shown) which may include, for example, propshafts, differential assemblies, and drive axles. The transmission input shaft 18 is coupled to and provides drive torque to the gear and clutch arrangement 22.

The gear and clutch arrangement 22 includes a plurality of gear sets and a plurality of shafts, neither of which is shown in detail. The plurality of gear sets may include individual intermeshing gears, such as planetary gear sets, that are connected to or selectively connectable to the plurality of shafts. The plurality of shafts may include layshafts or countershafts, sleeve and center shafts, reverse or idle shafts, or combinations thereof. It should be appreciated that the specific arrangement and number of the gear sets and the specific arrangement and number of the shafts within the transmission 14 may vary without departing from the scope of the present disclosure.

The gear and clutch arrangement 22 further includes a plurality of torque transmitting mechanisms, not shown in detail. The torque transmitting mechanisms are selectively engageable, singly or in combination, to initiate a plurality of forward and reverse gear or speed ratios by selectively coupling individual gears within the plurality of gear sets to the plurality of shafts. The torque transmitting mechanisms may be any type of clutch or brake, including wet clutches, band clutches, one-way clutches, etc., without departing from the scope of the present disclosure.

The transmission 14 also includes a transmission control module 26. The transmission control module 26 is preferably an electronic control device having a preprogrammed digital computer or processor, control logic, memory used to store data, and at least one I/O peripheral. The control logic includes a plurality of logic routines for monitoring, manipulating, and generating data. The transmission control module 26 controls the actuation of the torque transmitting mechanisms via a hydraulic control system 100.

The hydraulic control system 100 is operable to selectively engage the torque transmitting mechanisms within the gear and clutch arrangement 22 by selectively communicating a hydraulic fluid via a valve body 102 to a plurality of shift mechanisms, not shown, that engage the torque transmitting mechanisms. The valve body 102 may have various configurations but generally includes a plurality of valves, solenoids, and fluid passages, none of which are shown in detail. The hydraulic fluid is communicated to the valve body 102 under pressure from a pump 104 that is driven by the engine 12. Accordingly, the pump 104 is operable when the engine 12 is on or running and the pump 104 is inoperable when the engine 12 is off or not running. The pump 104 includes an inlet port 106 and an outlet port 108. The inlet port 106 communicates with a sump 110 and the outlet port communicates with the valve body 102, as will be described in greater detail below. The pump 104 may be of various types, for example, a gear pump, a vane pump, a gerotor pump, or any other positive displacement pump.

Figure 2A:
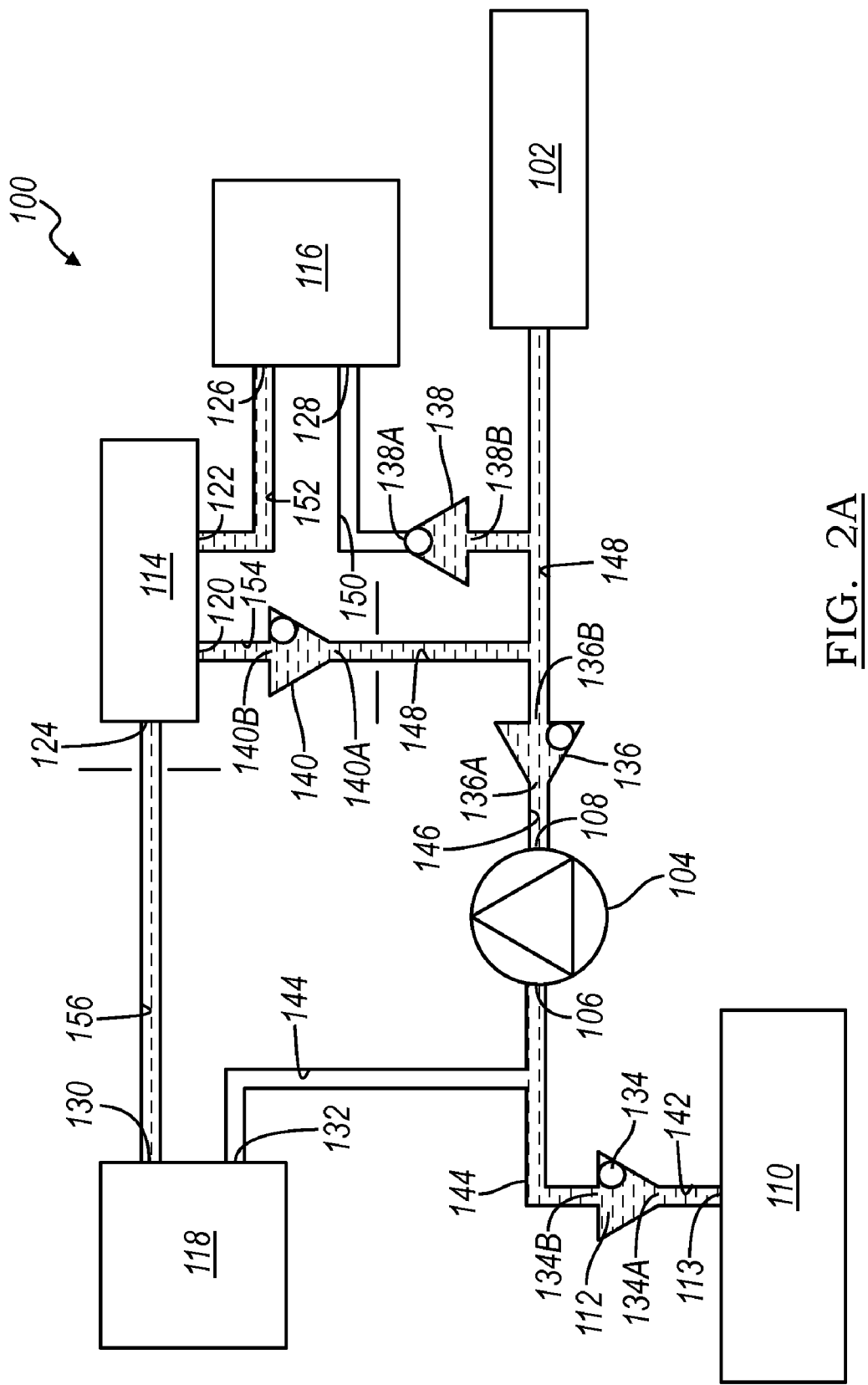
FIG. 2A is a diagram of an example of a hydraulic control system according to the principles of the present disclosure in first mode of operation.
Figure 2B:
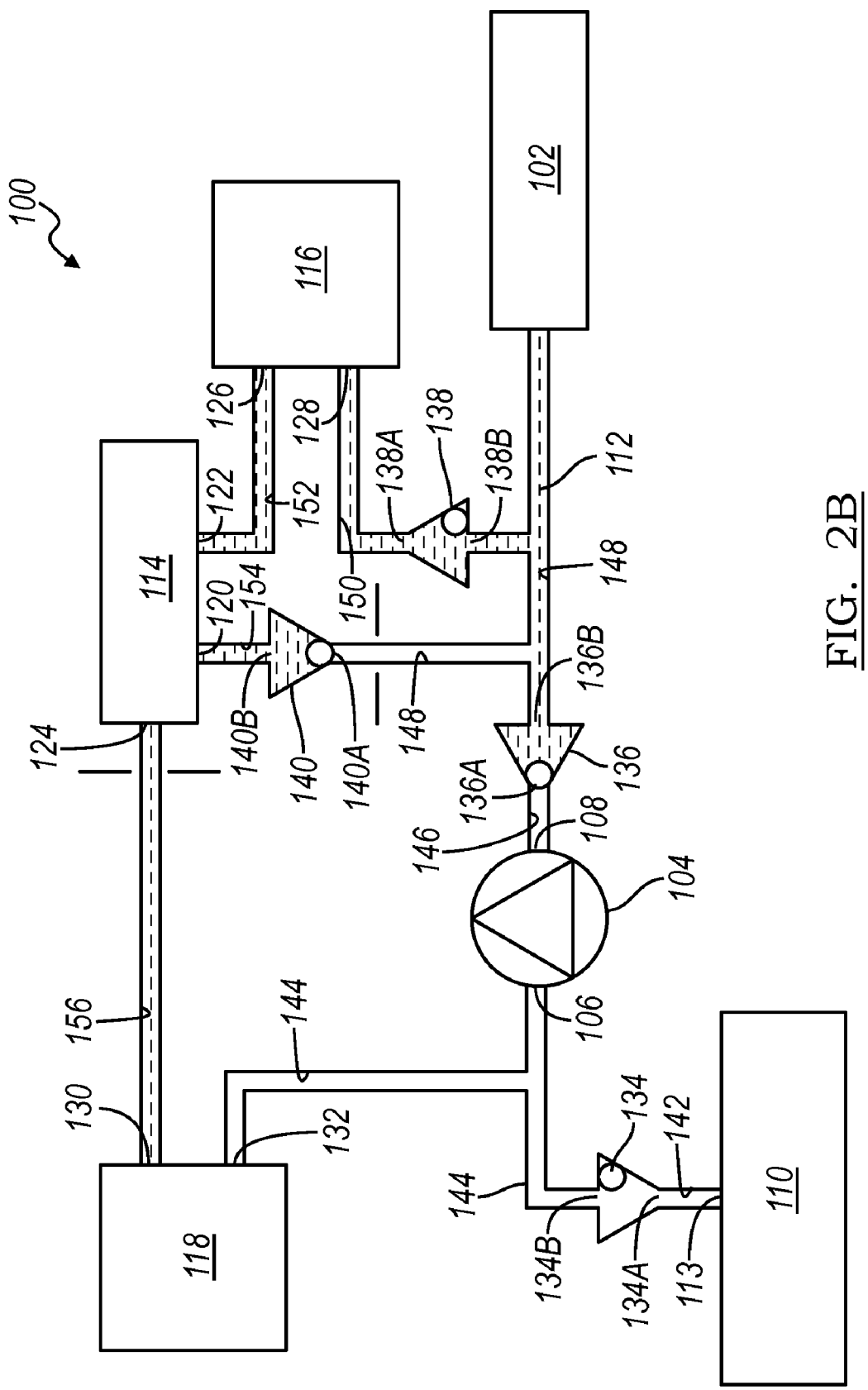
FIG. 2B is a diagram of an example of a hydraulic control system according to the principles of the present disclosure in second mode of operation.
Figure 2C:
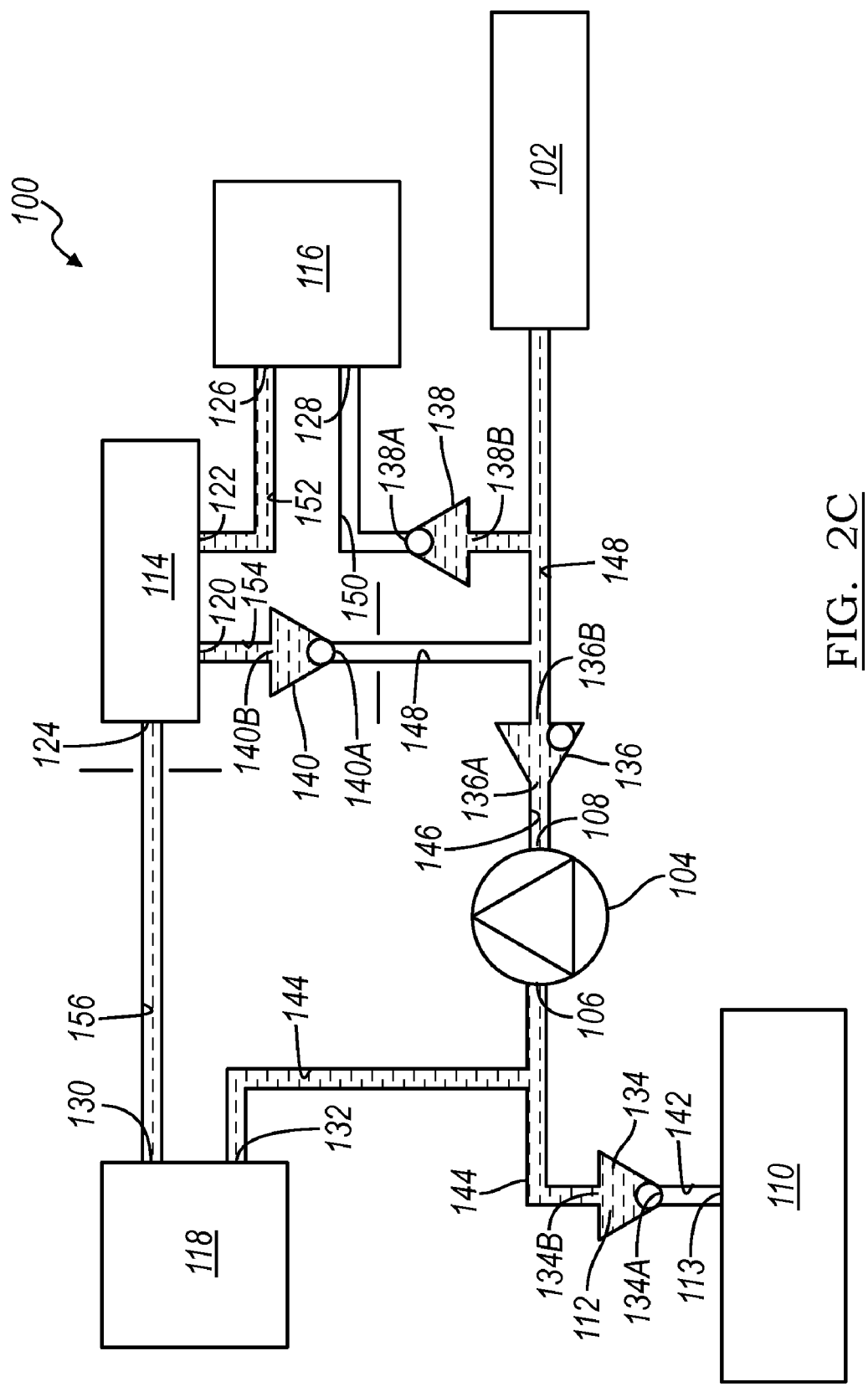
FIG. 2C is a diagram of an example of a hydraulic control system according to the principles of the present disclosure in third mode of operation.

Turning to FIGS. 2A-C, the sump 110 is a fluid reservoir, typically located at a bottom of the transmission 14, which is operable to store a hydraulic fluid 112. The sump 110 includes an outlet port 113. The outlet port 113 of the sump 110 communicates with the inlet port 106 of the pump 104.

The hydraulic control system 100 further includes an accumulator 114, a first control device 116, and a second control device 118 that cooperate to provide the hydraulic fluid 112 under pressure to the valve body 102 and the inlet port 106 of the pump 104, as will be described in greater detail below. The accumulator 114 is an energy storage device in which the non-compressible hydraulic fluid 112 is held under pressure by an external source. In the example provided, the accumulator 114 is a spring type or gas filled type accumulator having a spring or compressible gas that provides a compressive force on the hydraulic fluid 112 within the accumulator 114. However, it should be appreciated that the hydraulic accumulator 114 may be of other types, such as a gas-charged type, without departing from the scope of the present disclosure. In the example provided, the accumulator 114 includes an inlet port 120, a first outlet port 122, and a second outlet port 124. The inlet port 120 communicates with the outlet port 108 of the pump 104. The first outlet port 122 communicates with the first control device 116. The second outlet port 124 communicates with the second control device 118. It should be appreciated that the first and second outlet ports 122 and 124 may be combined into a single outlet port without departing from the scope of the present disclosure.

The first control device 116 is disposed between the first outlet port 122 of the accumulator 114 and the valve body 102. The first control device 116 includes an inlet port 126 and an outlet port 128. The first control device 116 is preferably a high flow, on-off solenoid that is normally closed. However, it should be appreciated that other types of solenoids and other control devices may be employed without departing from the scope of the present disclosure. The first control device 116 is electrically actuated by the controller 26 between a closed condition and an open condition. In the closed condition, the inlet port 126 is prevented from communicating with the outlet port 128. In the open condition, the inlet port 126 is allowed to communicate with the outlet port 128.

The second control device 118 is disposed between the second outlet port 124 of the accumulator 114 and the inlet port 106 of the pump 104. The second control device 118 includes an inlet port 130 and an outlet port 132. The second control device 118 is preferably a high flow, on-off solenoid that is normally closed. However, it should be appreciated that other types of solenoids and other control devices may be employed without departing from the scope of the present disclosure. The second control device 118 is electrically actuated by the controller 26 between a closed condition and an open condition. In the closed condition, the inlet port 130 is prevented from communicating with the outlet port 132. In the open condition, the inlet port 130 is allowed to communicate with the outlet port 132. In an alternate embodiment, the second control device 118 is a thermal regulator device. The thermal regulator device senses or detects a temperature of the hydraulic fluid 112 or an ambient temperature. If the sensed temperature exceeds a predetermined threshold temperature, the thermal regulator device is in the closed condition. If the sensed temperature is less than the predetermined threshold temperature, the thermal regulator device is in the open condition. The predetermined threshold temperature may be selected as any temperature below which it is desireable to prime the pump 104 with the accumulator 114.

The hydraulic control system 100 also includes first, second, third, and fourth one-way valves 134, 136, 138, and 140, respectively, that are operable to control the direction of flow of the hydraulic fluid 112. The first one-way valve 134 is disposed between the sump 110 and the pump 104 and the second control device 118. The first one-way valve 134 includes a port 134A and a port 134B. The first one-way valve 134 allows for fluid communication in one direction only. In the example provided, the first one-way valve 134 allows for fluid communication from port 134A to port 134B and prevents fluid communication from port 134B to port 134A. While the first one-way valve 134 is illustrated as a ball check valve, it should be appreciated that other types of one-way valves or other control devices may be employed in the location of the first one-way valve 134 without departing from the scope of the present disclosure.

The second one-way valve 136 is disposed between the pump 104 and the valve body 102. The second one-way valve 136 includes a port 136A and a port 136B. The second one-way valve 136 allows for fluid communication in one direction only. In the example provided, the second one-way valve 136 allows for fluid communication from port 136A to port 136B and prevents fluid communication from port 136B to port 136A. While the second one-way valve 136 is illustrated as a ball check valve, it should be appreciated that other types of one-way valves or other control devices may be employed in the location of the second one-way valve 136 without departing from the scope of the present disclosure.

The third one-way valve 138 is disposed between the first control device 116 and the valve body 102. The third one-way valve 138 includes a port 138A and a port 138B. The third one-way valve 138 allows for fluid communication in one direction only. In the example provided, the third one-way valve 138 allows for fluid communication from port 138A to port 138B and prevents fluid communication from port 138B to port 138A. While the third one-way valve 138 is illustrated as a ball check valve, it should be appreciated that other types of one-way valves or other control devices may be employed in the location of the third one-way valve 138 without departing from the scope of the present disclosure.

The fourth one-way valve 140 is disposed between the accumulator 114 and the valve body 102. The fourth one-way valve 140 includes a port 140A and a port 140B. The fourth one-way valve 140 allows for fluid communication in one direction only. In the example provided, the fourth one-way valve 140 allows for fluid communication from port 140A to port 140B and prevents fluid communication from port 140B to port 140A. While the fourth one-way valve 140 is illustrated as a ball check valve, it should be appreciated that other types of one-way valves or other control devices may be employed in the location of the fourth one-way valve 140 without departing from the scope of the present disclosure.

The components of the hydraulic control system 100 are connected via a plurality of fluid communication lines. It should be appreciated that the fluid communication lines may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure. In the example provided, a fluid communication line 142 connects the port 113 of the sump 110 with port 134A of the first one-way valve 134. A fluid communication line 144 connects port 134B of the first one-way valve 134 with the inlet port 106 of the pump 104 and the outlet port 132 of the second control device 118. A fluid communication line 146 connects the outlet port 108 of the pump 104 with port 136A of the second one-way valve 136. A fluid communication line 148 connects port 136B of the second one-way valve 136 with valve body 102, port 138B of the third one-way valve 138, and port 140A of the fourth one-way valve 140. A fluid communication line 150 connects port 138A of the third one-way valve 138 with the outlet port 128 of the first control device 116. A fluid communication line 152 connects the inlet port 126 of the first control device 116 with the first outlet port 122 of the accumulator 114. A fluid communication line 154 connects the inlet port 120 of the accumulator 114 with port 140B of the fourth one-way valve 140. Finally, a fluid communication line 156 connects the second outlet port 124 of the accumulator 114 with the inlet port 130 of the second control device 130.

The operation of the hydraulic control system 100 will now be described. The hydraulic control system 100 operates in a plurality of modes: a first mode, shown in FIG. 2A, wherein the engine 12 is on thereby operating the pump 104 and charging the accumulator 114; a second mode, shown in FIG. 2B, wherein the engine 12 is off or restarting and the main pump 104 is not operating or operating at a condition that provides low pressure and the accumulator 114 is discharging in order to provide pressurized hydraulic fluid 112 to the valve body 102; and a third mode, shown in FIG. 2C, wherein the engine 12 is off or restarting and the main pump 104 is not operating or operating at a condition that provides low pressure and the accumulator 114 is discharging in order to provide pressurized hydraulic fluid 112 to the inlet port 106 of the pump 104. It should be appreciated that the hydraulic control system 100 may operate in both the second and third mode simultaneously (i.e. providing pressurized hydraulic fluid 112 to both the valve body 102 and the inlet port 106 of the pump 104).

With reference to FIG. 2A, during the first mode of operation, the engine 12 is on and both the first control device 116 and the second control device 118 are in the closed condition. The engine 12 operates the pump 104 and the pump 104 draws hydraulic fluid 112 from the sump 110 through the inlet port 106 and provides pressurized hydraulic fluid 112 out the outlet port 108. The hydraulic fluid 112 from the outlet port 108 of the pump 104 communicates through line 146, through the second one-way valve 136 to line 148. The hydraulic fluid 112 from line 148 is communicated to the valve body 102 and through the fourth one-way valve 140 to the accumulator 114. The accumulator 114 is charged with pressurized hydraulic fluid 112 by closing the first and second control devices 116 and 118. In this condition, the fourth one-way valve 140 prevents the accumulator 114 from discharging therethrough.

With reference to FIG. 2B, when the motor vehicle stops (i.e., at a red light for example), the engine 12 shuts off and the main pump 104 stops rotating, so there is no pressure in the hydraulic circuit providing oil to the valve body 102. To start the motor vehicle without delay, the hydraulic circuit must be filled with pressurized hydraulic fluid 112. Accordingly, during, or shortly before engine restart, the first control device 116 is commanded to the open condition. The accumulator 114 discharges and provides pressurized hydraulic fluid 112 from the first outlet port 122 to the inlet port 126 of the first control device 116 via line 152. The hydraulic fluid 112 from the inlet port 126 communicates through the first control device 116 to the outlet port 128. Hydraulic fluid 112 from the outlet port 128 communicates through line 150, from line 150 through the third one-way valve 138 and into line 148. The hydraulic fluid 112 from line 148 is communicated to the valve body 102. In this way, the accumulator 114 quickly provides pressurized hydraulic fluid 112 to the valve body 102 as the pump 104 restarts until such time as the pump 104 is fully operational and providing full line pressure to the valve body 102.

With reference to FIG. 2C, when it is desirable to prime the pump 104 with hydraulic fluid 112, the second control device 118 is commanded to the open condition. Accordingly, the accumulator 114 discharges and provides pressurized hydraulic fluid 112 from the second outlet port 124 to the inlet port 130 of the second control device 118 via line 156. The hydraulic fluid 112 from the inlet port 130 communicates through the second control device 118 to the outlet port 132. The hydraulic fluid 112 from the outlet port 132 communicates through line 144 to the inlet 106 of the pump 104, thereby quickly providing hydraulic fluid 112 to the pump 104 for use.

The description of the invention is merely exemplary in nature and variations that do not depart from the gist of the invention are intended to be within the scope of the invention. Such variations are not to be regarded as a departure from the spirit and scope of the invention.

We claim the following:

1. A hydraulic control system in a powertrain, the powertrain having a transmission and an engine, the hydraulic control system comprising:
    a sump for storing a hydraulic fluid;
    a pump having an inlet in communication with the sump and an outlet, wherein the pump is powered by the engine;
    a valve system in communication with the outlet of the pump, wherein the valve system is operable to control the transmission;
    an accumulator for storing and releasing the hydraulic fluid, the accumulator in communication with the outlet of the pump and with the valve system;
    a first control device disposed between the accumulator and the valve system, the first control device having an open condition for allowing fluid communication between the accumulator and the valve system and a closed condition for preventing fluid communication between the accumulator and the valve system;
    a second control device disposed between the accumulator and the inlet of the pump, the second control device having an open condition for allowing fluid communication between the accumulator and the inlet of the pump and a closed condition for preventing fluid communication, between the accumulator and the inlet of the pump, and wherein the second control device is a thermal regulator device operable to sense a temperature;
    wherein the accumulator is charged with the hydraulic fluid when the engine is on and the pump is powered, wherein the accumulator stores the hydraulic fluid when the first control device and the second control device are in the closed condition, wherein the accumulator releases the hydraulic fluid and charges the valve system when the first control device is in the open condition, and wherein the accumulator releases the hydraulic fluid and charges the pump when the second control device is in the open condition.

2. The hydraulic control system of claim 1 wherein the second control device is an on/off solenoid.

3. The hydraulic control system of claim 1 wherein the thermal regulator device is in the closed condition when the thermal regulator device senses a temperature above a predetermined threshold and is in the open condition when the thermal regulator device senses a temperature below the predetermined threshold.

4. The hydraulic control system of claim 1 wherein the first control device is a solenoid.

5. The hydraulic control system of claim 1 further comprising a first one-way valve in communication with the sump, the inlet of the pump, and the second control device, wherein the first one-way valve allows communication of the hydraulic fluid from the sump to the inlet of the pump and prevents communication of the hydraulic fluid from the second control device to the sump.

6. The hydraulic control system of claim 1 further comprising a second one-way valve in communication with the outlet of the pump, the valve system, and the accumulator, and wherein the second one-way valve allows communication of the hydraulic fluid from the outlet of the pump to the valve system and prevents communication of the hydraulic fluid from the accumulator to the outlet of the pump.

7. The hydraulic control system of claim 6 further comprising a third one-way valve in communication with second one-way valve, the valve system, and the first control device, wherein the third one-way valve allows communication of the hydraulic fluid from the accumulator and the first control device to the valve system and prevents communication of the hydraulic fluid from the outlet of the pump and the second one-way valve to the first control device.

8. The hydraulic control system of claim 7 further comprising a fourth one-way valve in communication with second one-way valve, the third one-way valve, the accumulator, and the valve system, wherein the fourth one-way valve allows communication of the hydraulic fluid from the second one-way valve and the pump to the accumulator and prevents communication of the hydraulic fluid from the accumulator to the valve system.

9. The hydraulic control system of claim 8 wherein the fourth one-way valve is in parallel relationship with the third one-way valve and the first control device.

10. A hydraulic control system in a powertrain, the powertrain having a transmission and an engine, the hydraulic control system comprising:
    a sump for storing a hydraulic fluid;
    a pump having an inlet and an outlet, wherein the pump is powered by the engine;

a valve system operable to control the transmission;

an accumulator for storing and releasing the hydraulic fluid;

a first control device having an inlet and an outlet, the first control device having an open condition for allowing fluid communication between the inlet and the outlet and a closed condition for preventing fluid communication between the inlet and the outlet, wherein the inlet is connected to the accumulator;

a second control device having an inlet and an outlet, the second control device having an open condition for allowing fluid communication between the inlet and the outlet and a closed condition for preventing fluid communication between the inlet and the outlet, wherein the inlet is connected to the accumulator, and wherein the second control device is a thermal regulator device;

a first one-way valve having a first port and a second port, wherein the first one-way valve is operable to allow fluid communication from the first port to the second port, and wherein the first port is connected with the sump and the second port is connected with the inlet of the pump and the second port of the second control device;

a second one-way valve having a first port and a second port, wherein the second one-way valve is operable to allow fluid communication from the first port to the second port, and wherein the first port is connected with outlet of the pump and the second port is connected with the valve system;

a third one-way valve having a first port and a second port, wherein the third one-way valve is operable to allow fluid communication from the first port to the second port, and wherein the first port is connected with the outlet of the first control device and the second port is connected with the second port of the second one-way valve and the valve system; and a fourth one-way valve having a first port and a second port, wherein the fourth one-way valve is operable to allow fluid communication from the first port to the second port, and wherein the first port is connected with the second port of the second one-way valve, the second port of the third one-way valve, and the valve system and the second port is connected directly to the accumulator;

wherein the accumulator is charged with the hydraulic fluid when the engine is on and the pump is powered, wherein the accumulator stores the hydraulic fluid when the first control device and the second control device are in the closed condition, wherein the accumulator releases the hydraulic fluid and charges the valve system when the first control device is in the open condition, and wherein the accumulator releases the hydraulic fluid and charges the pump when the second control device is in the open condition.

11. The hydraulic control system of claim 10 wherein the second control device is an on/off solenoid.

12. The hydraulic control system of claim 10 wherein the second control device is operable to sense a temperature, wherein the thermal regulator device is in the closed condition when the thermal regulator device senses a temperature above a predetermined threshold and is in the open condition when the thermal regulator device senses a temperature below the predetermined threshold.

13. The hydraulic control system of claim 10 wherein the first control device is a solenoid.

* * * * *